United States Patent Office 2,939,066
Patented May 31, 1960

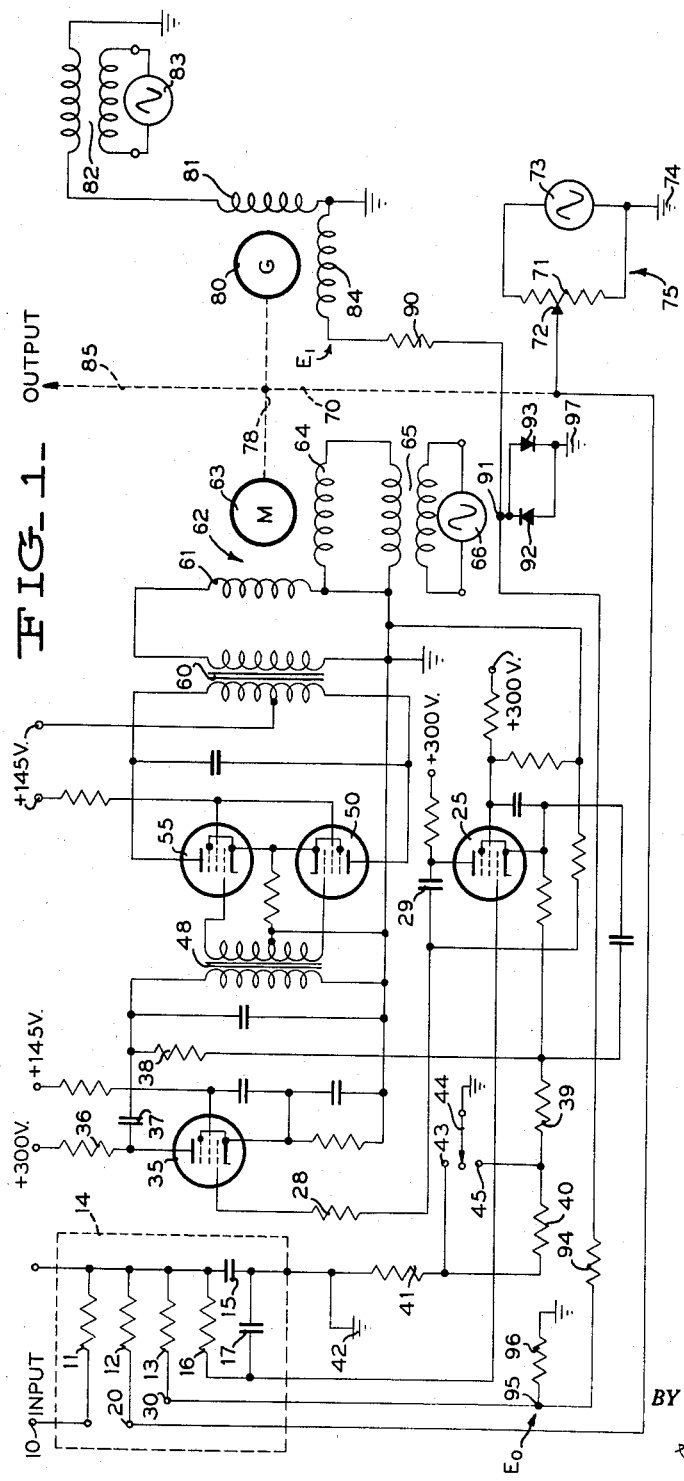
INVENTOR.
JAMES H. CRENSHAW
BY Geoffrey Knight
ATTORNEY

2,939,066

VARIABLE DAMPED SERVOMOTOR SYSTEM

James H. Crenshaw, Vestal, N.Y., assignor to International Business Machines Corporation, New York, N.Y., a corporation of New York Filed Oct. 25, 1956, Ser. No. 618,344

3 Claims. (Cl. 318—448)

The present invention relates to servo systems and in particular to systems wherein a velocity voltage proportional to the speed of the receiver motor is utilized to provide dampening of the motor to prevent overshooting.

An object of the present invention is to provide a servo system wherein dampening means are provided to prevent overshooting by the receiver motor.

A further object of this invention is to provide dampening means which is variable in accordance with the unbalanced condition of the system.

Other objects of the invention will be pointed out in the following description and claims and illustrated in the accompanying drawing, which discloses, by way of example, the principle of the invention and the best mode, which has been contemplated, of applying that principle.

In the drawing:

Figure 1 shows the improved servo system.

Figure 2 shows graphically the relationship between the velocity voltage developed and the voltage connected to the summing amplifier.

In previously known servo systems, a velocity voltage proportional to the follow-up velocity of the receiver motor has been utilized to reduce the input signal voltage so that the motor speed will be reduced and overshooting prevented. The velocity voltage is therefore used to regulate the speed of the receiver motor in rebalancing. For a system wherein the input voltage is incrementally increased or decreased, i.e., where the changes are separated by time intervals wherein the input voltage is constant, this system presents no problem since the receiver has sufficient time to follow up before another change in input voltage is presented.

In a system wherein there are input voltage variations which are constantly increasing or decreasing over extended time periods, the above system presents an obvious disadvantage in that the receiver motor position will lag the transmitter motor position by an amount proportional to the rate of change of the input voltage. The initial error voltage, i.e., when the system is first unbalanced, operates the receiver motor to rebalance the system. If the system has a large unbalance, the error voltage is large and the receiver motor starts to rotate at a high velocity. However, since the velocity voltage is connected to the input, it functions to decrease the error voltage until, at a particular motor velocity, the resultants of these factors will be constant and the motor will operate at this speed for a constantly changing input voltage. The effect therefore is that the receiver motor will lag the transmitter by a constant factor and will not approach the desired position until the input rate of change becomes zero.

Figure 1 illustrates apparatus wherein this obvious disadvantage has been alleviated. The transmitter has not been shown since it forms no part of the present invention. It is sufficient to say that any transmitter capable of delivering a variable amplitude A.C. voltage would be acceptable. It is apparent that while this system uses A.C. voltages, the invention contemplates D.C. as well.

The position voltage of a transmitter (not shown) is connected to an input 10 of a summing circuit 14. Summing circuit 14 is composed of a number of large resistors 11, 12 and 13 which are connected to the individual voltages at 10, 20 and 30 which are to be added together. Each voltage connected to its individual resistor in the summing circuit 14 is therefore connected in parallel with the other voltages. The impedance of the circuit composed of resistor 16 and capacitors 15 and 17 is small as compared to the individual impedance of resistors 11, 12 and 13. The current flow will therefore be from the individual inputs 10, 20 and 30 through the individual elements 15, 16 and 17 to ground and no interaction will occur between the voltages at inputs 10, 20 and 30. The voltage at the grid of tube 25 will therefore be directly proportional to the sum of the voltages at each of the individual inputs.

Where the transmitter and receiver are initially balanced, the voltage at the grid of tube 25 is zero since the input voltage at 10 is equal in magnitude but opposite in phase to the input voltage at 20. When the voltage at input 10 changes, the change is manifested at the grid of tube 25.

Tube 25 amplifies the signal applied to its grid and the amplified signal at the plate of tube 25 is coupled through a capacitor 29 to the grid of tube 35 wherein the signal is again amplified. The amplified signal at the plate of tube 35 is in phase with the signal applied to the grid of tube 25 since there have been two phase reversals, one in each of tubes 25 and 35. When part of the output of tube 35 is coupled through capacitor 37 and resistors 38, 39, 40 and 41 to ground, the cathode of tube 25, connected between resistors 38 and 39 varies in the same manner as the applied signal to the grid of tube 25. This effectively decreases the gain of tube 25 and increases the stability of the gain of amplifiers 25 and 35. To decrease the gain of tube 25, the switch 44 is operated to close its contact 43 or 45. The closing of switch 44 to contact 43 or 45 shunts out resistors 41 or 40 and 41, respectively. This closing of the switch 44 therefore increases the gain of the amplifier 25 progressively.

The output of tube 35 is coupled by means of transformer 48 to a power amplifier comprising the tubes 50 and 55. Tubes 50 and 55 work in push-pull. The output of this push-pull arrangement is coupled by means of transformer 60 to a motor winding 61 of a split phase motor indicated generally at 62. A motor winding 64 is supplied with power by a source 66 and a transformer 65. The phase of the signal applied to amplifier 25 determines the direction of current flow in winding 61 in relation to the current flow in winding 64. The direction of rotation of split phase motors is determined by the relation of the phases of the currents in the windings so that in this motor the rotor 63 rotates in a direction to null the signal which initially caused the rotation.

A mechanical connection 70 is made from the rotor 63 to a potentiometer shown generally at 75. The potentiometer 75 is supplied with a source of A.C. potential 73 grounded at 74. The tap 72 moves up and down the resistance element in accordance with the movement of rotor 63. The potential at tap 72 and consequently at input 20 is 180° out of phase with the input potential at 10 and operates to null this last-mentioned potential. For an increase in potential at the input 10, the rotor 63 of motor 62 is driven in a direction to move the tap 72 of potentiometer 75 in a direction to increase the voltage applied at input 20.

Connected to the rotor 63 of motor 62 by a mechanical connection 78 is a generator 80. Generator 80 is supplied with a source of A.C. potential 83 by transformer 82 connected to a field winding 81. An output winding 84 has induced therein a voltage dependent upon the velocity of motor 62, i.e., the greater the velocity of motor 62 the greater the output voltage across winding 84. This voltage $E_1$ developed in winding 84 is 180° out of phase with the voltage at the control grid of tube 25 which produced the voltage $E_1$. The voltage $E_1$ is coupled through a resistor 90 and 94 to the input 30 of summing network 14 wherein it serves to reduce the voltage which initially caused the voltage $E_1$ to be developed.

Connected to rotor 63 is a shaft 85 which it is desired to position in accordance with the position of the transmitter shaft as represented by the input voltage at 10.

It is therefore seen that the circuit comprises an input voltage at 10 indicative of the position of the transmitter shaft; a circuit for using this voltage to rotate the receiver motor; a voltage feedback indicative of the position of receiver motor shaft and a velocity voltage feedback dependent upon the velocity at which the receiver motor is rebalancing. The phase of the velocity voltage will be dependent upon the direction of rotation of the receiver motor and will be such as to oppose the voltage producing the voltage in the motor circuit.

As mentioned previously, a disadvantage of prior systems of this type is the fact that there will be a lag in rebalancing for a constantly increasing voltage at input 10. This is evident because the velocity voltage feedback used to prevent overshooting will also prevent the receiver motor from ever synchronizing with the transmitter position while the input voltage is increasing, i.e., there will be a time at which the velocity voltage will reduce the input to a point just sufficient to keep the velocity voltage constant.

In order to avoid this disadvantage the velocity voltage path has been modified so that the feedback voltage is attenuated in accordance with the amplitude of the feedback voltage. The velocity voltage $E_1$ is applied to resistors 90, 94 and 96. A voltage $E_0$, at point 95, is applied to the summing network 14. Connected to point 91 between resistors 90 and 94 are parallel connected diodes 92 and 93 grounded at 97. Diodes 92 and 93 are connected so that for A.C. voltages both positive and negative waves are clipped in equal amounts. This is accomplished by connecting the diode 93 so that it will present a large impedance to negative potential, and negligible impedance to positive potential and by connecting the diode 92 in a reverse direction to provide opposite results. The parallel circuit is connected to ground. Diodes have the inherent function of presenting a non-linear impedance inversely proportional to the voltage then being applied. As an example of this phenomenon, a large voltage at 91, and therefore a large $E_1$, will have a negligible impedance to ground, while a small voltage at 91, and therefore a small $E_1$, will have a large impedance to ground.

Figure 2 is a graph of voltages $E_0$ and $E_1$. From this it can be seen that $E_0$ increases linearly with respect to $E_1$ for small values of $E_1$ but flattens out as $E_1$ increases over a certain value so that the voltage $E_0$ never goes above a certain value. Therefore when generator 80 develops a large voltage $E_1$, the diodes will present a small impedance and the voltage at point 91 and the voltage $E_0$ will be attenuated, and there will be less dampening of motor M because of the velocity voltage feedback.

As the voltage $E_1$ decreases in value, the potential at 91 will remain relatively constant since the impedance of the diodes increases as the voltage $E_1$ decreases. With the voltage at 91 remaining relatively constant, the current through 94 and 96 to ground will be constant and voltage $E_0$ at point 95 will remain constant over a large range of velocity voltage values. At low values of $E_1$, the current flow through 92 and 93 will be negligible, while the current flow through 94 and 96 will be substantially $$I = \frac{E_1}{R_{90} + R_{94} + R_{96}}$$

where I is the current through $R_{96}$. It can be seen that for further decreases in $E_1$, there will be a decrease in I and, consequently, a decrease in $E_0$. In this region, $E_0$ varies linearly with the velocity of the motor and serves to stabilize the servo in the conventional manner. Resistors 94 and 96 are selected to adjust the ratio of $E_0$ to motor speed to provide the desired amount of dampening.

When the error voltage at the grid of tube 25 is large and the voltage developed by generator 80 is large, the velocity voltage $E_0$ fed back to the circuit 14 is attenuated. As the error voltage to the grid of tube 25 is reduced by reason of the voltage feedback from potentiometer 75, the motor 62 has its speed of follow-up reduced. At a generator voltage of $E_x$, Figure 2, corresponding to a predetermined speed of generator 80, the voltage $E_0$ begins to decrease in value as $E_1$ decreases in value. With $E_1$ decreasing because the velocity of motor 62 is decreasing there is obviously a constantly decreasing input to tube 25. With the velocity voltage feedback $E_0$ decreasing as the input to 25 decreases, it can be seen that dampening is selectively provided in accordance with the degree of unbalance which then exists in the system which tends to prevent the receiver motor from overshooting.

It can be seen therefore that what has been provided is a velocity feedback voltage which varies according to the degree of unbalance.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a servo system including a motor, means controlled by said motor for producing a voltage variable in accordance with the position of said motor, an input voltage variable in accordance with the desired position of said motor, summing means for said input voltage and said motor position voltage for obtaining an error voltage to drive said motor toward a position determined by said input voltage, means responsive to the movement of said motor for generating a velocity voltage proportional to the speed of said motor, feedback means for connecting said velocity voltage to said summing means to reduce said error voltage, and impedance means shunting said feedback path, said impedance means having a non-linear impedance variable inversely to the applied voltage to reduce the velocity voltage to a predetermined level.

2. The system as in claim 1, wherein said variable impedance comprises two oppositely poled diodes connected in parallel.

3. The system as in claim 2, wherein said velocity voltage is connected to ground by a plurality of series connected resistors, said variable impedance means being connected between ground and a point between two of said plurality of resistors.

References Cited in the file of this patent

UNITED STATES PATENTS

| | | |
|---|---|---|
| 2,455,364 | Hays | Dec. 7, 1948 |
| 2,586,034 | Halpert | Feb. 19, 1952 |
| 2,692,358 | Wild | Oct. 19, 1954 |
| 2,812,485 | Schieber | Nov. 5, 1957 |

OTHER REFERENCES

Standard Handbook for Electrical Engineers, 8th ed. sect. 12-153, Knowlton.